United States Patent
Homma et al.

(10) Patent No.: US 7,870,533 B2
(45) Date of Patent: Jan. 11, 2011

(54) DELAY ANALYSIS APPARATUS, DELAY ANALYSIS METHOD AND COMPUTER PRODUCT

(75) Inventors: Katsumi Homma, Kawasaki (JP); Izumi Nitta, Kawasaki (JP); Toshiyuki Shibuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 12/073,039

(22) Filed: Feb. 28, 2008

(65) Prior Publication Data

US 2008/0222586 A1    Sep. 11, 2008

(30) Foreign Application Priority Data

Mar. 8, 2007    (JP)    ............... 2007-058877

(51) Int. Cl.
*G06F 17/50*    (2006.01)

(52) U.S. Cl. ...................... 716/108; 716/106

(58) Field of Classification Search ..................... 716/4, 716/5, 6, 106, 108
See application file for complete search history.

(56) References Cited

U.S. PATENT DOCUMENTS 5,933,433 A * 8/1999 Miyashita .................. 370/508
7,681,161 B2 * 3/2010 Homma et al. .................. 716/6
2006/0107244 A1 * 5/2006 Yonezawa ....................... 716/4
2008/0178130 A1 * 7/2008 He ................................. 716/4

FOREIGN PATENT DOCUMENTS

JP    2005-100310    4/2005

OTHER PUBLICATIONS

Aseem Agarwal et al., "Statistical Timing Analysis for Intra-Die Process Variations with Spatial Correlations" Proc. ICCAD 2003, pp. 900-907.

* cited by examiner

*Primary Examiner*—Sun J Lin
(74) *Attorney, Agent, or Firm*—Staas & Halsey LLP

(57) ABSTRACT

Within-die delay distributions and die-to-die delay distributions of two arbitrary paths in an analysis target circuit are extracted from a delay distribution library, and an effect index indicative of a relative error of an overall path delay distribution of one path and an overall path delay distribution when the two paths are integrated as one path is calculated based on the within-die delay distributions and the die-to-die delay distributions of the two paths. When the effect index is determined to be equal to or above a threshold, the overall path delay distribution of the two paths integrated as one path is calculated. Hence, a path that affects an analysis result alone is selected to execute a statistical Max operation, thereby increasing a speed of delay analysis processing.

20 Claims, 9 Drawing Sheets

DELAY ANALYSIS APPARATUS, DELAY ANALYSIS METHOD AND COMPUTER PRODUCT

CROSS-REFERENCE TO RELATED APPLICATIONS

This application is based upon and claims the benefit of priority from the prior Japanese Patent Application No. 2007-058877, filed on Mar. 8, 2007, the entire contents of which are incorporated herein by reference.

BACKGROUND OF THE INVENTION

1. Field of the Invention

The present invention relates to technology of delay analysis in a circuit.

2. Description of the Related Art

In recent years, with the miniaturization of semiconductor integrated circuits, the influence of statistical variations, e.g., process variations, reductions in power supply voltage, and crosstalk, has become considerable, and circuit delay variations have increased. In conventional static timing analysis (STA), circuit delay variations are accommodated by a larger delay margin; however, timing design becomes difficult due to the larger the delay margin.

Therefore, the need for statistical static timing analysis (SSTA) that can reduce such unnecessary delay margins with accurate consideration statistical variations is increasing. In SSTA, statistical variations include both independent variations and correlated variations between circuit elements/wiring lines.

To accurately obtain a delay distribution of an entire circuit based on SSTA, both types of variations must be considered. The Monte Carlo simulation is an example of a technique for accurately calculating delay distribution over an entire circuit with consideration of such variations.

A technique that separates delay variations relative to opposed paths in an analysis target circuit into systematic variations and random variations, uses the systematic variations and the random variations to approximately calculate the delay distribution of an entire circuit has also been disclosed (see, for example, Japanese Patent Application Laid-open No. 2005-100310).

Further, a technique that sequentially processes paths in an analysis target circuit to approximately calculate the delay distribution of the entire circuit has been disclosed (see, for example, Agarwal, Blaauw, Zolotov, Proc. ICCAD '03, pp. 900-907 (2003)). Specifically, a statistical MAX operation is sequentially performed with respect to a first delay distribution that takes into consideration independent variations between circuit elements/wiring lines of each path and a second delay distribution that takes into consideration correlated variations between circuit elements/wiring lines, and the first delay distribution and the second delay distribution of the entire circuit are calculated. Then, a convolution distribution of the first delay distribution and the second delay distribution of the entire circuit is determined as a delay distribution representing delay in the entire analysis target circuit.

However, according to the conventional Monte Carlo simulation, to calculate the delay distribution with accurate consideration of independent and correlated variations, a huge memory capacity and a long calculation are required. Therefore, the conventional technology has a problem in that the period required for delay analysis is prolonged and the design period is thereby increased.

According to the conventional technology of Japanese Patent Application Laid-open No. 2005-100310, since each statistical variation is estimated as the worst value, a pessimistic and inaccurate delay distribution is calculated. Therefore, circuit design must be consequently adjusted afterwards, resulting in an increased burden on the designer and a longer design period.

According to the conventional technology of Agarwal, Blaauw, Zolotov, Proc. ICCAD '03, pp. 900-907 (2003), when the scale of an analysis target circuit is increased, the number of paths in the analysis target circuit becomes several thousands to several hundred thousands, and the problem of a huge calculation still remains. Consequently, the period required for delay analysis is prolonged and the design period is increased.

SUMMARY OF THE INVENTION

It is an object of the present invention to at least solve the above problems in the conventional technologies.

A computer-readable recording medium according to one aspect of the present invention stores therein a computer program for analyzing delay in a target circuit having a plurality of paths using within-die delay distributions and die-to-die delay distributions thereof, in which each within-die delay distribution is based on circuit element performances of all circuit elements in each path and each die-to-die delay distribution is based on a mutual correlation between the circuit elements. The computer program causes a computer to execute extracting the within-die delay distributions and the die-to-die delay distributions of two paths from a delay distribution aggregation; calculating an effect index indicative of a relative error of an overall path delay distribution of one path and an overall path delay distribution of an integrated path formed by the two paths, based on the within-die delay distributions and the die-to-die delay distributions of the two paths; judging whether the effect index is equal to or greater than a threshold value; and calculating the overall path delay distribution of the integrated path based on a judgment result at the judging.

A delay analysis apparatus according to another aspect of the present invention analyzes delay in a target circuit having a plurality of paths using within-die delay distributions and die-to-die delay distributions thereof, in which each within-die delay distribution is based on circuit element performances of all circuit elements in each path and each die-to-die delay distribution is based on a mutual correlation between the circuit elements. The delay analysis apparatus includes an extracting unit that extracts the within-die delay distributions and the die-to-die delay distributions of two paths from a delay distribution aggregation; an effect index calculating unit that calculates an effect index indicative of a relative error of an overall path delay distribution of one path and an overall path delay distribution of an integrated path formed by the two paths, based on the within-die delay distributions and the die-to-die delay distributions of the two paths; a judging unit that judges whether the effect index is equal to or greater than a threshold value; and an overall path delay distribution calculating unit that calculates the overall path delay distribution of the integrated path based on a judgment result of the judging unit.

A delay analysis method according to still another aspect of the present invention is for analyzing delay in a target circuit having a plurality of paths using within-die delay distributions and die-to-die delay distributions thereof, in which each within-die delay distribution is based on circuit element performances of all circuit elements in each path and each die-to-die delay distribution is based on a mutual correlation between the circuit elements. The delay analysis method includes extracting the within-die delay distributions and the die-to-die delay distributions of two paths from a delay distribution aggregation; calculating an effect index indicative of a relative error of an overall path delay distribution of one path and an overall path delay distribution of an integrated path formed by the two paths, based on the within-die delay distributions and the die-to-die delay distributions of the two paths; judging whether the effect index is equal to or greater than a threshold value; and calculating the overall path delay distribution of the integrated path based on a judgment result at the judging.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
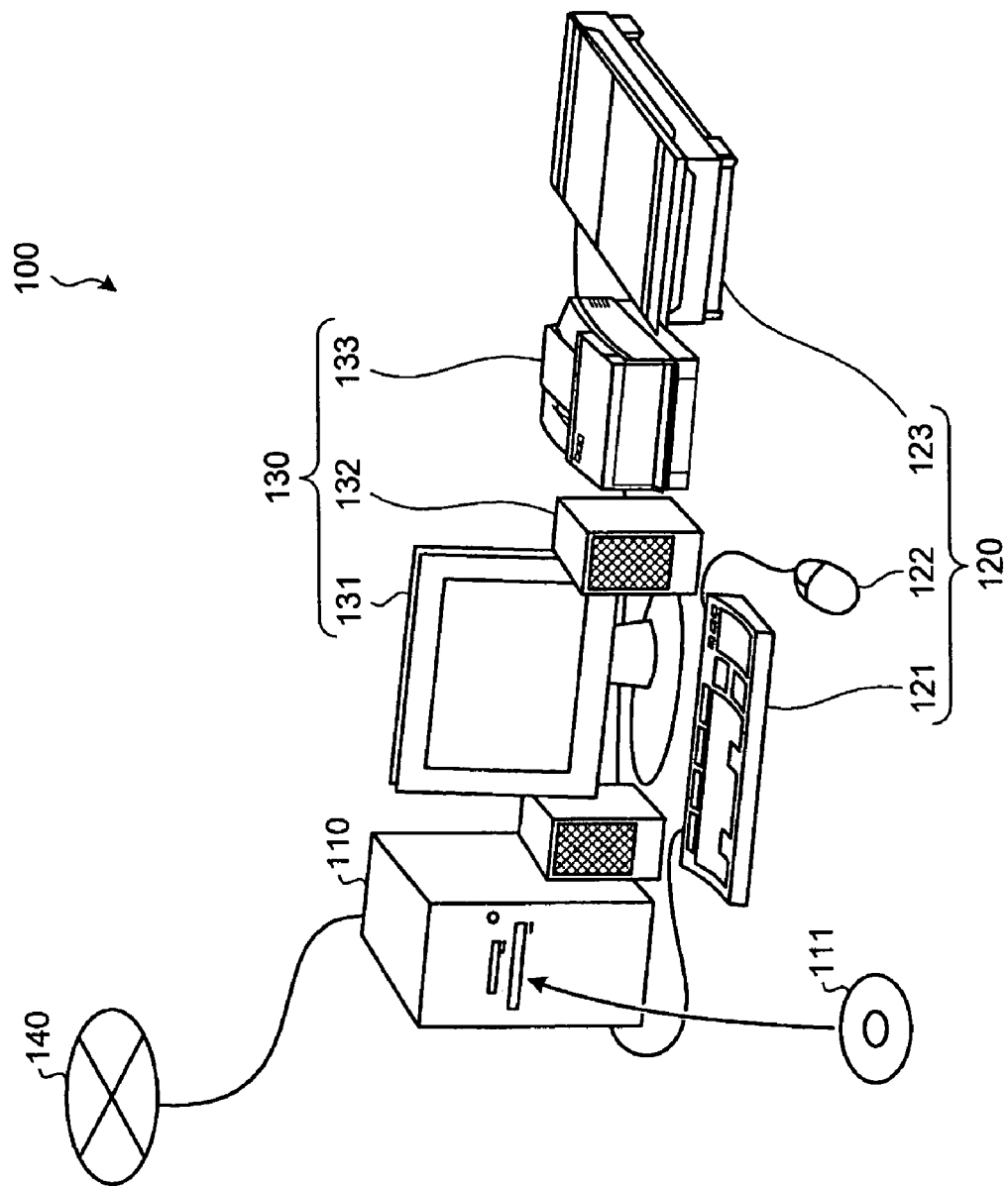
FIG. 1 is a block diagram of a delay analysis apparatus according to an embodiment of the present invention.

FIG. 1 is a block diagram of a delay analysis apparatus according to an embodiment of the present invention. As shown in FIG. 1, a delay analysis apparatus 100 includes a computer 110, an input device 120, and an output device 130, and can be connected with a network 140, e.g., an LAN, a WAN, or the Internet through a non-depicted router or a modem.

The computer 110 has a CPU, a memory, and an interface. The CPU controls the entire delay analysis apparatus 100. The memory is formed of, for example, read-only memory (ROM), a random access memory (RAM), a hard disk (HD), an optical disk 111, or a flash memory. The memory is used as a work area for the CPU.

Various programs are stored in the memory and loaded in response to a command from the CPU. The reading/writing data from/into the HD and the optical disk 111 is controlled by a disk drive. The optical disk 111 and the flash memory are removable. The interface controls input from the input device 120, output to the output device 130, and transmission/reception with respect to the network 140.

As the input device 120, a keyboard 121, a mouse 122, and a scanner 123 are adopted. The keyboard 121 includes keys to input, for example, characters, numeric figures, and various kinds of instructions, and data is input through the keyboard 121. The keyboard 121 may be a touch panel type. The mouse 122 is used to move a cursor, select a range, move a window, or change a window size. The scanner 123 optically reads an image as image data, which is stored in the memory of the computer 110. The scanner 123 may have an optical character recognition (OCR) function.

As the output device 130, a display 131, a speaker 132, a printer 133, and others are adopted. The display 131 displays a cursor, an icon, or a tool box as well as data, such as text, an image, and function information. The speaker 132 outputs sound, e.g., a sound effect or a text-to-voice converted sound. The printer 133 prints image data or text data.

Figure 2:
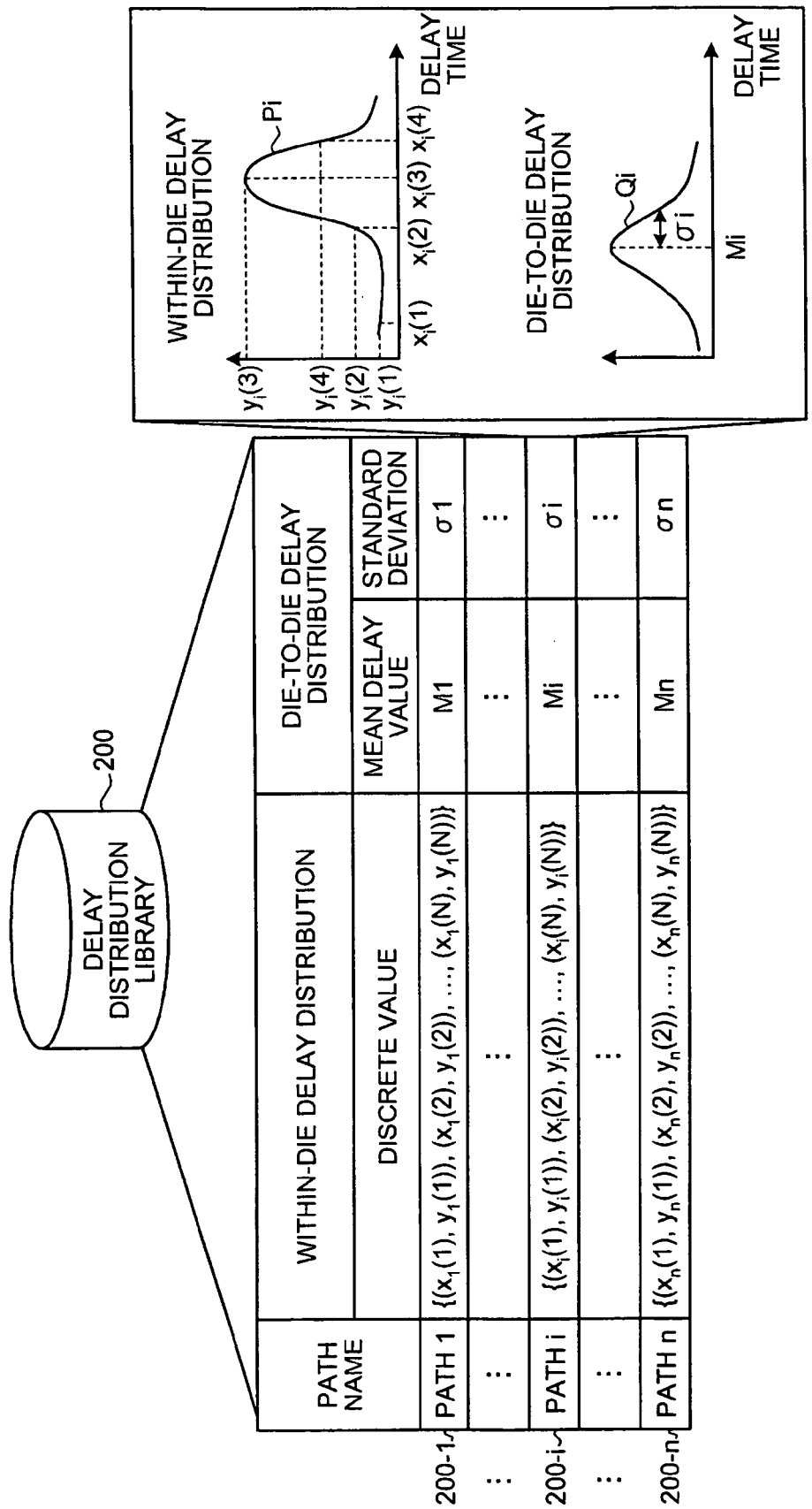
FIG. 2 is a first schematic of contents stored in a delay distribution library.

FIG. 2 is a first schematic of contents stored in a delay distribution library 200. As shown in FIG. 2, the delay distribution library 200 stores respective pieces of delay distribution information 200-1 to 200-$n$ for each path in an analysis target circuit. The path is, for example, a partial circuit that shares a critical path and a flip-flop (FF).

The delay distribution information 200-1 to 200-$n$ includes delay distribution concerning circuit delay for each path. Specifically, the delay distribution information 200-1 to 200-$n$ includes a within-die delay distribution representing delay based on circuit element performance for all circuit elements in each path and a die-to-die delay distribution representing delay based on a correlation between circuit elements in each path.

Taking a path i as an example, a discrete value $\{(x_i(1), y_i(1)), (x_i(2), y_i(2)), \ldots, (x_i(N), y_i(N))\}$ that specifies the within-die delay distribution, and a mean delay value Mi and a standard deviation σi of the die-to-die delay distribution are included, and respective delay distribution functions include a probability density function Pi and a probability density function Qi.

The within-die delay distribution and the die-to-die delay distribution for each path can be calculated based on SSTA using a circuit delay distribution and an inter-element delay distribution that represent delay in each circuit element in the analysis target circuit, for example.

Figure 3:
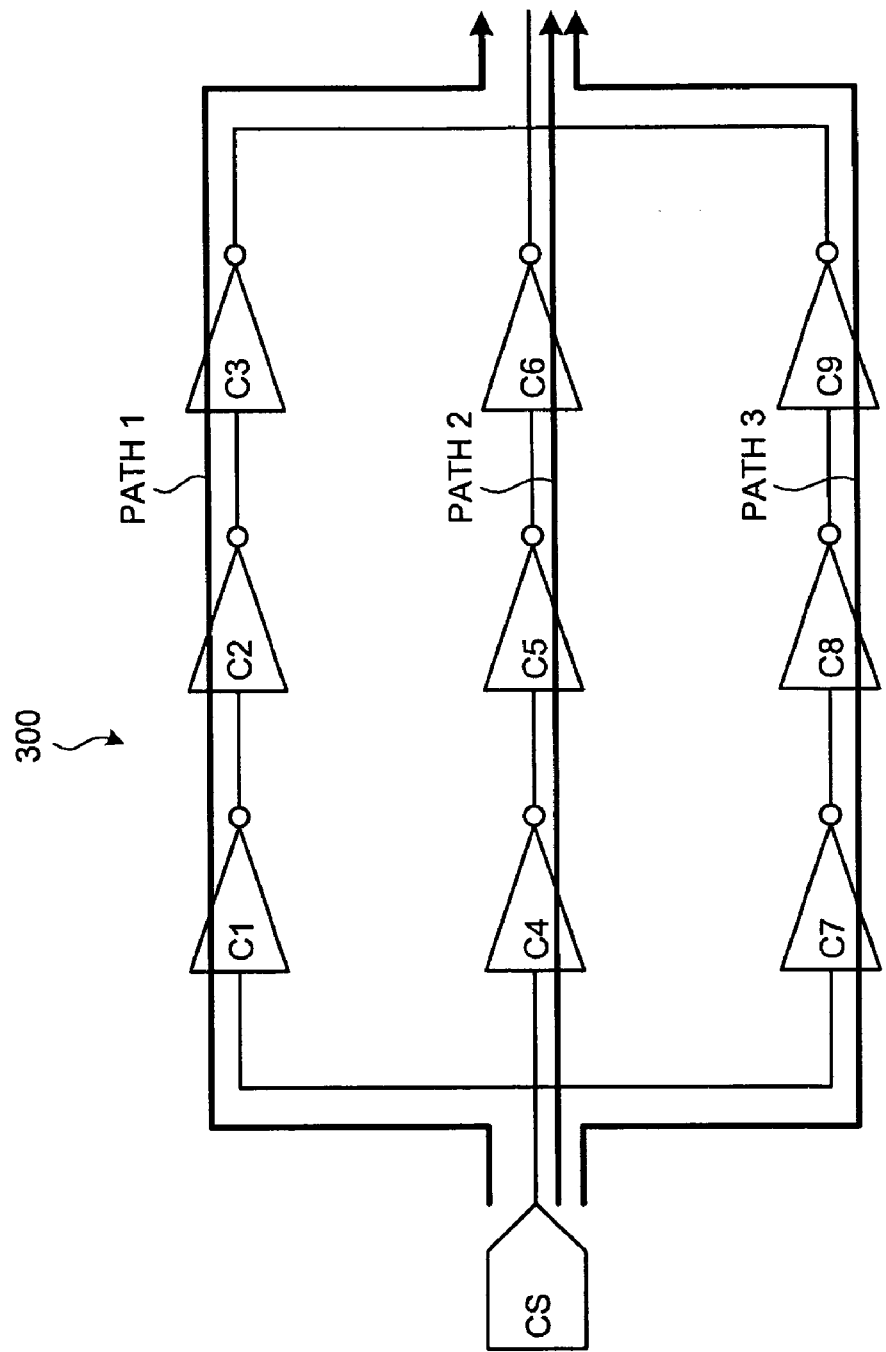
FIG. 3 is a circuit diagram of an example of an analysis target circuit according to the embodiment of the present invention.

FIG. 3 is a circuit diagram of an example of an analysis target circuit 300 according to the embodiment of the present invention. The drawing depicts a part of the analysis target circuit. As shown in FIG. 3, the analysis target circuit 300 includes circuit elements C1 to C9.

As shown in FIG. 3, a path 1 passes through the circuit elements C1, C2, and 3C, a path 2 passes through the circuit elements C4, C5, and C6, and a path 3 passes through the circuit elements C7, C8, and C9. Circuit elements include, for example, a flip-flop, a buffer, and an inverter. A clock source CS is a clock generator using, for example, a crystal or ceramic oscillator.

Figure 4:
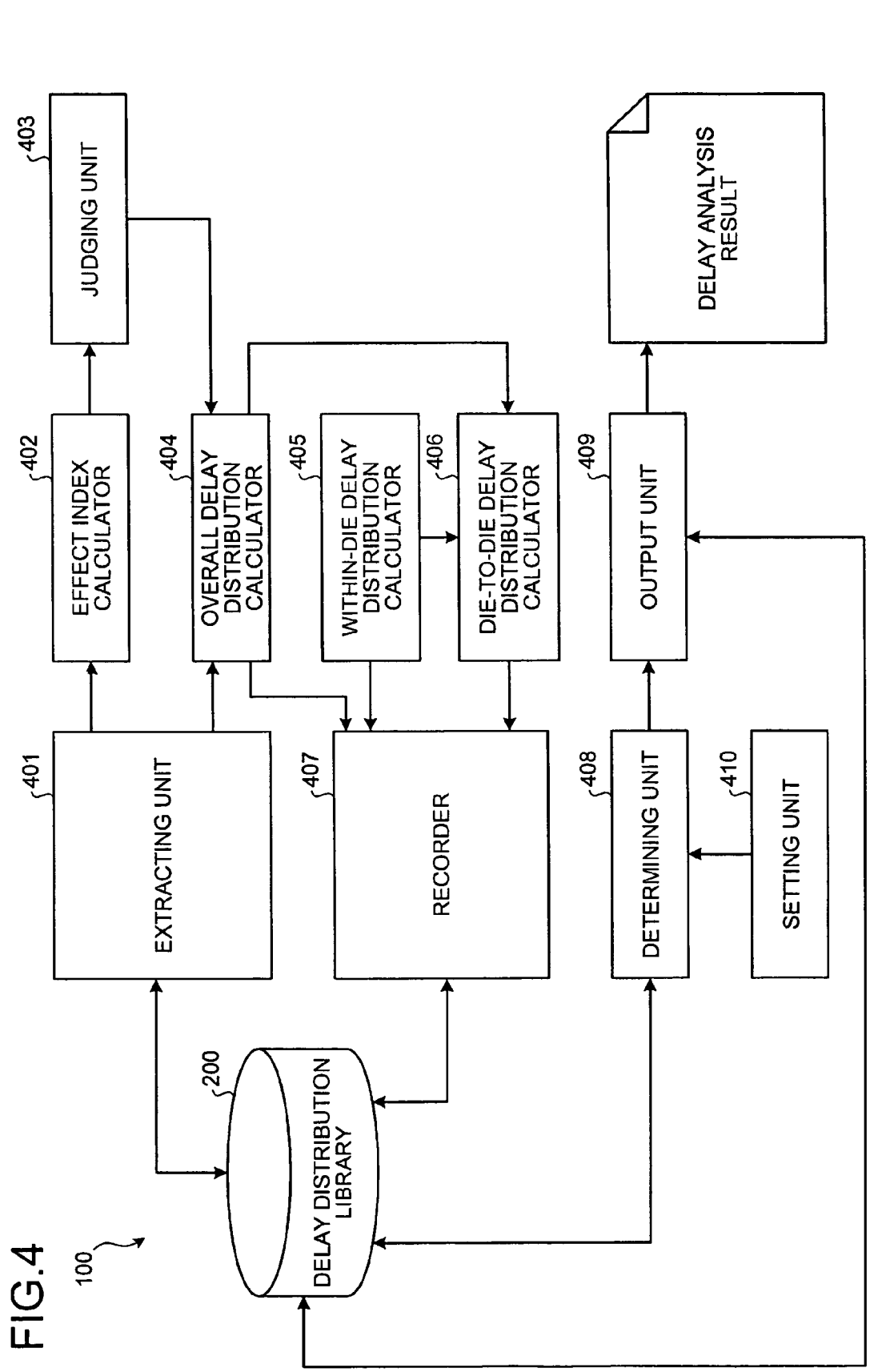
FIG. 4 is a functional diagram of the delay analysis apparatus.

FIG. 4 is a functional diagram of the delay analysis apparatus 100. As shown in FIG. 4, the delay analysis apparatus 100 includes the delay distribution library 200, an extracting unit 401, an effect index calculator 402, a judging unit 403, an overall path delay distribution calculator 404, a within-die delay distribution calculator 405, a die-to-die delay distribution calculator 406, a recorder 407, a determining unit 408, an output unit 409, and a setting unit 410.

The respective functions of the units 401 to 410 can be implemented by causing the CPU to execute a corresponding program stored in the memory. Output data of the respective units 401 to 410 is stored in the memory. Corresponding to the connection destinations, indicated by the arrows in FIG. 4, the CPU reads the output data of the connection sources from the memory, and executes a corresponding program.

The delay analysis apparatus 100 is a computer apparatus that causes a computer to execute delay analysis of an analysis target circuit by using a delay distribution representing delay based on element performances of all circuit elements in each path (hereinafter, "within-die delay distribution") and a delay distribution representing delay based on a mutual correlation between circuit elements in each path (hereinafter, "die-to-die delay distribution").

As shown in FIG. 4, the extracting unit 401 extracts, from an aggregation of delay distributions, within-die delay distributions and die-to-die delay distributions of two arbitrary paths in the analysis target circuit.

Specifically, for example, the extracting unit 401 extracts within-die delay distributions and die-to-die delay distributions of two arbitrary paths in the analysis target circuit 300 (see FIG. 3) from the delay distribution library 200 (see FIG. 2) storing therein within-die delay distributions and die-to-die delay distributions for each of the paths, path 1 to n, in the analysis target circuit 300.

More specifically, for example, the extracting unit 401 extracts the delay distribution information 200-1 and 200-2 concerning the path 1 and the path 2 from the delay distribution library 200, and stores the delay distribution information 200-1 and 200-2 in the memory.

Here, the within-die delay distribution means a delay distribution statistically representing the circuit delay of all circuit elements in each path with consideration of element performance variation that is independent with respect to each circuit element in the path. The die-to-die delay distribution means a delay distribution statistically representing circuit delay in each path with consideration of variation based on a mutual correlation between circuit elements in the path.

The within-die delay distribution and the die-to-die delay distribution of each path can be obtained by timing analysis. Specifically, for example, SSTA can calculate the within-die delay distribution and the die-to-die delay distribution of each path from net list data of the analysis target circuit and variation data (delay distribution) representing a delay variation for each circuit element/wiring line in the analysis target circuit.

When a timing analysis result obtained by timing analysis (the within-die delay distribution and the die-to-die delay distribution of each path in the analysis target circuit) is input to the delay analysis apparatus 100, the timing analysis result is stored in the delay distribution library 200.

The effect index calculator 402 calculates an effect index indicative of a relative error of a delay distribution representing delay in one path overall (hereinafter, "overall path delay distribution") and an overall path delay distribution when two paths are integrated as one path based on the within-die delay distributions and the die-to-die delay distributions of the two paths extracted by the extracting unit 401.

Specifically, the effect index calculator 402 reads, from the memory, the within-die delay distributions and the die-to-die delay distributions of the two paths extracted by the extracting unit 401, calculates an effect index indicative of a relative error of the overall path delay distribution of one path and the overall path delay distribution when the two paths are integrated as one path, and stores the effect index in the memory.

More specifically, the effect index calculator 402 may use statistics of the within-die delay distribution and the die-to-die delay distribution of one path, and statistics of the within-die delay distribution and the die-to-die delay distribution of the other path to calculate the effect index. The statistic is a numerical value indicative of characteristics or a tendency of each delay distribution, and is, for example, a mean, dispersion, or a standard deviation of each delay distribution.

The effect index is an index indicative of a degree of effect of delay in one of the two paths on delay in the other path. When the effect index is high, the effect of delay in one path on the delay in the other path is large. When the effect index is low, the effect of delay in one path on delay in the other path is small.

Here, the effect of delay in one of the two paths on the delay in the other path is defined as "effect index=|Mt−Md|/Mt". However, Mt is a mean delay value of the overall path delay distribution when the two paths are integrated as one path, and Md is a mean delay value of the overall path delay distribution of one path.

That is, the effect index is a relative error in a mean delay value of the overall path delay distribution of one path with respect to a mean delay value of the overall path delay distribution when the two paths are integrated as one path. A difference between the overall path delay distribution when the two paths are integrated as one path and the overall path delay distribution of one path can be roughly judged from the effect index.

The degree of effect can be evaluated from a statistic of the delay distribution of one of the two paths and a statistic of the delay distribution of the other path. A technique of calculating an effect index indicative of a relative error of the overall path delay distribution of one path and the overall path delay distribution when the two paths are integrated as one path by estimating an influence degree in a simple manner will now be explained.

The technique of calculating the effect index will now be explained with one of two paths being determined as a pre-path whilst the other path being determined as a selected path. However, respective symbols are determined as follows.

(mc, σc): (mean delay value, standard deviation of the die-to-die delay distribution of the selected path)

(apc, anc): (within-die delay distribution coefficient of the selected path)

(md, σd): (mean delay value, standard deviation of the die-to-die delay distribution of the pre-path)

(apd, and): (within-die delay distribution coefficient of the pre-path). The within-die delay distribution of each path is determined as a normal distribution. Here, verification of the following inequality (1) is achieved.

$$k \times (\sigma d + \sqrt{\sigma c^2 + h^2}) < md - mc \quad (1)$$
$$\Rightarrow \text{effect index} \leq A \times (3 \times \Phi(-k))^{\frac{3}{4}}$$

Where, h=Max(|apc−apd|, |and−anc|), k is an arbitrary positive integer, Φ is a cumulative distribution function of a standard normal distribution, and A is a constant concerning a higher-order moment of the overall path delay distribution of the selected path and the overall path delay distributions of the pre-path and the selected path and is empirically estimated from, for example, actual data for practical use. When a threshold value of an effect index is preset, appropriately adjusting k enables verification of the following inequality (2).

$$k \times (\sigma d + \sqrt{\sigma c^2 + h^2}) < md - mc \Rightarrow \text{effect index} \leq \text{threshold value}^T \quad (2)$$

Here, the within-die delay distribution of each path is assumed to have normal distribution. However, when the distribution is not normal distribution, inequality (1) is used as a judgment reference for execution of a statistical Max operation of the overall path delay distribution of the selected path and the overall path delay distribution of the pre-path as one kind of heuristic.

When inequality (1) is not satisfied with respect to the delay distribution of the selected path and the delay distribution of the pre-path, this means that an effect index of the delay distribution of the selected path is high. On the other hand, when inequality (1) is satisfied, this means that the effect index of the delay distribution of the selected path is low.

Evaluating the effect index by using inequality (1) or (2) in this manner enables estimating a relative error of the overall path delay distribution of one path and the overall path delay distribution when the two paths are integrated as one path in a simple manner.

The judging unit 403 judges whether the effect index calculated by the effect index calculator 402 is equal to or above a predetermined threshold value. Specifically, the judging unit 403 reads the effect index calculated by the effect index calculator 402, judges whether the effect index is equal to or above the threshold value, and stores a judgment result in the memory.

The overall path delay distribution calculator 404 calculates an overall path delay distribution when two paths are integrated as one path based on the judgment result of the judging unit 403. Specifically, the overall path delay distribution calculator 404 reads the judgment result of the judging unit 403 from the memory. When the judgment result indicates that the effect index is equal to or greater than the threshold value, the overall path delay distribution calculator 404 calculates an overall path delay distribution when two paths are integrated as one path.

More specifically, when the judgment result indicates that the effect index is equal to or greater than the predetermined threshold value, the overall path delay distribution calculator 404 executes a statistical Max operation to calculate an overall path delay distribution when the two paths are integrated as one path based on the within-die delay distribution and the die-to-die delay distribution of one path and the within-die delay distribution and the die-to-die delay distribution of the other path extracted by the extracting unit 401, and stores the overall path delay distribution in the memory.

Figure 5:
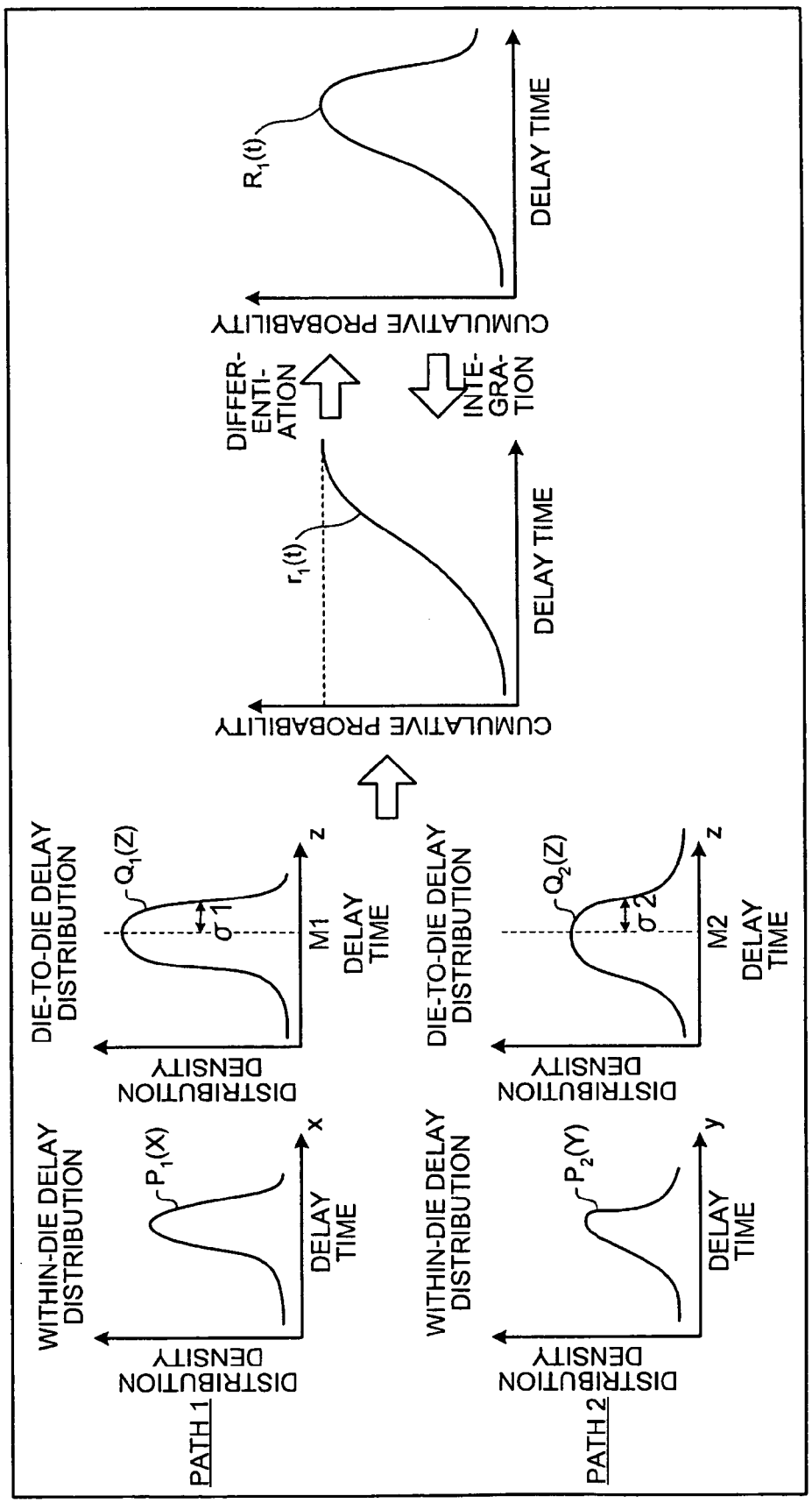
FIG. 5 is a schematic outlining calculation of an overall path delay distribution.

A specific procedure of calculating an overall path delay distribution when two paths are integrated as one path based on the within-die delay distributions and the die-to-die delay distributions of the two paths will now be explained. FIG. 5 is a schematic outlining calculation of the overall path delay distribution. Here, an example of calculation of the overall path delay distribution based on the delay distribution information 200-1 and 200-2 concerning the path 1 and the path 2 stored in the delay distribution library 200 will be explained.

In the following explanation, $P_1(X)$ denotes a probability density function of the within-die delay distribution of the path 1, and $Q_1(Z)$ designates a probability density function of the die-to-die delay distribution of the same. $P_2(Y)$ denotes a probability density function of the within-die delay distribution of the path 2, and $Q_2(Z)$ designates a probability density function of the die-to-die delay distribution of the same.

$R_1(t)$ denotes a probability density function of the overall path delay distribution representing entire delay when the path 1 and the path 2 depicted in FIG. 3 are integrated as one path. Here, the die-to-die delay distribution of each of the path 1 and the path 2 has characteristics probabilistically varying based on a common probability variable on the same chip.

Specifically, each of the probability density functions $Q_1(Z)$ and $Q_2(Z)$ of the die-to-die delay distributions can be represented by the following equations (3) or (4) using a standard deviation σ and a mean delay value M of each probability density distribution and a probability variable n(Z) that is common on the same chip (given in common to all circuit elements on the same chip).

$$Q_1(Z)=\sigma 1\times n(Z)+M1 \quad (3)$$

$$Q_2(Z)=\sigma 2\times n(Z)+M2 \quad (4)$$

The probability variable n(Z) common to equations (3) and (4) is a normal distribution having "mean: 1" and "standard deviation: 1", and can be represented by the following equation (5).

$$n(Z) = \frac{1}{\sqrt{2\pi}} \cdot e^{-\frac{Z^{2^T}}{2}} \quad (5)$$

FIG. 5 depicts the probability density function $P_1(X)$ of the within-die delay distribution and the probability density function $Q_1(Z)$ of the die-to-die delay distribution of the path 1 and the probability density function $P_2(Y)$ of the within-die delay distribution and the probability density function $Q_2(Z)$ of the die-to-die delay distribution of the path 2.

These probability density functions $P_1(X)$, $P_2(Y)$, $Q_1(Z)$, and $Q_2(Z)$ are used to calculate the probability density function $R_1(t)$ of the in-path overall density distribution representing overall delay when the path 1 and the path 2 are integrated as one path. Specifically, the following equation (6) is first used to obtain a probability density function of a cumulative probability distribution concerning the path 1 and the path 2.

$$r_1(t)=\iiint P_1(X)P_2(Y)n(Z)dXdYdZ \max(X+\sigma 1 n(Z)+M1, Y+\sigma 2 n(Z)+M2) \leq t \quad (6)$$

Then, differentiating the probability density function $r_1(t)$ of the cumulative probability distribution obtained from equation (6) enables calculation of the probability density function $R_1(t)$ of the overall path delay distribution representing overall delay when the path 1 and the path 2 are integrated as one path.

The within-die delay distribution calculator 405 calculates a within-die delay distribution when two paths are integrated as one path based on a within-die delay distribution of one path and a within-die delay distribution of the other path extracted by the extracting unit 401.

Specifically, the within-die delay distribution calculator 405 reads the within-die delay distribution of one path and the within-die delay distribution of the other path extracted by the extracting unit 401 from the memory, calculates an within-die delay distribution when the two paths are integrated as one path, and stores the within-die delay distribution in the memory.

The within-die delay distribution represents circuit delay with consideration of a variation of element performance that is independent with respect to each circuit element in each path, and is a delay distribution that is independent with respect to each path. Therefore, for example, a probability density distribution of the within-die delay distribution when the path 1 and the path 2 depicted in FIG. 3 are integrated as one path can be represented by the following equation (7) using probability density functions $P_1(X)$ and $P_2(Y)$ of the within-die delay distributions of the path 1 and the path 2. Here, $F_1(t)$ denotes a probability density distribution of the within-die delay distribution when the path 1 and the path 2 are integrated as one path.

$$F_1(t)=p_1(t)\int_{-\infty}^{\infty} P_2(Y)dY+P_2(t)\int_{-\infty}^{\infty} P_1(X)dX \quad (7)$$

The die-to-die delay distribution calculator 406 calculates a die-to-die delay distribution when two paths are integrated as one path based on the overall path delay distribution calculated by the overall path delay distribution calculator 404 and the within-die delay distribution calculated by the within-die delay distribution calculator 405.

Specifically, the die-to-die delay distribution calculator 406 reads the overall path delay distribution calculated by the overall path delay distribution calculator 404 and the within-die delay distribution calculated by the within-die delay distribution calculator 405, calculates a die-to-die delay distribution when two paths are integrated as one path, and stores the die-to-die delay distribution in the memory.

More specifically, the die-to-die delay distribution calculator 406 first calculates a "mean: L" and a "standard deviation: Γ" of a probability density function $R_1(t)$ of the overall path delay distribution calculated by the overall path delay distribution calculator 404. Then, the die-to-die delay distribution calculator 406 calculates a "mean: 1" and a "standard deviation: γ" of a probability density function $F_1(t)$ of the within-die delay distribution calculated by the within-die delay distribution calculator 405.

The probability density distribution of the die-to-die delay distribution when two paths are integrated as one path that is to be obtained here can be represented by the following equations (8), (9), and (10) using the "mean: L" and the "standard deviation: Γ" of the probability density function $R_1(t)$ and the "mean: 1" and the "standard deviation: γ" of the probability density function $F_1(t)$ Here, $G_1(Z)$ denotes a probability density function of the die-to-die delay distribution when the two paths are integrated as one path.

$$G_1(Z)=AZ+B \quad (8)$$

$$A=\sqrt{\Gamma^2-\gamma^2} \quad (9)$$

$$G_1(Z)=AZ+B \quad (10)$$

The equations utilize mathematical properties of the probability density distribution. Specifically, a mean of the probability density distribution after convolution is a sum of means of the two probability density distributions before convolution. A square of the standard deviation of the probability density distribution after convolution is a sum of squares of the standard deviations of the two probability density distributions before convolution.

Such properties are applied to the within-die delay distribution, the die-to-die delay distribution, and the overall path delay distribution. That is, the mathematical properties can be applied to a relationship that the within-die delay distribution and the die-to-die delay distribution are convoluted to calculate the overall path delay distribution.

Again referring to FIG. 4, the recorder 407 records the within-die delay distribution calculated by the within-die delay distribution calculator 405 and the die-to-die delay distribution calculated by the die-to-die delay distribution calculator 406 as the within-die delay distribution and the die-to-die delay distribution of one path in a delay distribution aggregation in place of the within-die delay distribution and the die-to-die delay distribution extracted by the extracting unit 401.

Specifically, the recorder 407 reads the within-die delay distribution calculated by the within-die delay distribution calculator 405 and the die-to-die delay distribution calculated by the die-to-die delay distribution calculator 406 from the memory, and records these delay distributions in a delay distribution aggregation in place of the within-die delay distribution and the die-to-die delay distribution extracted by the extracting unit 401.

More specifically, for example, the recorder 407 records delay distribution information when the path 1 and the path 2 are integrated as one path in the delay distribution library 200 in place of the respective pieces of delay distribution information 200-1 and 200-2 concerning the path 1 and the path 2 extracted from the delay distribution library 200.

That is, the respective pieces of delay distribution information 200-1 and 200-2 concerning the two paths are deleted from the delay distribution library 200, and the new delay distribution information is recorded in the delay distribution library 200. As a result, delay distribution information stored in the delay distribution library 200 is reduced by one piece.

Figure 6:
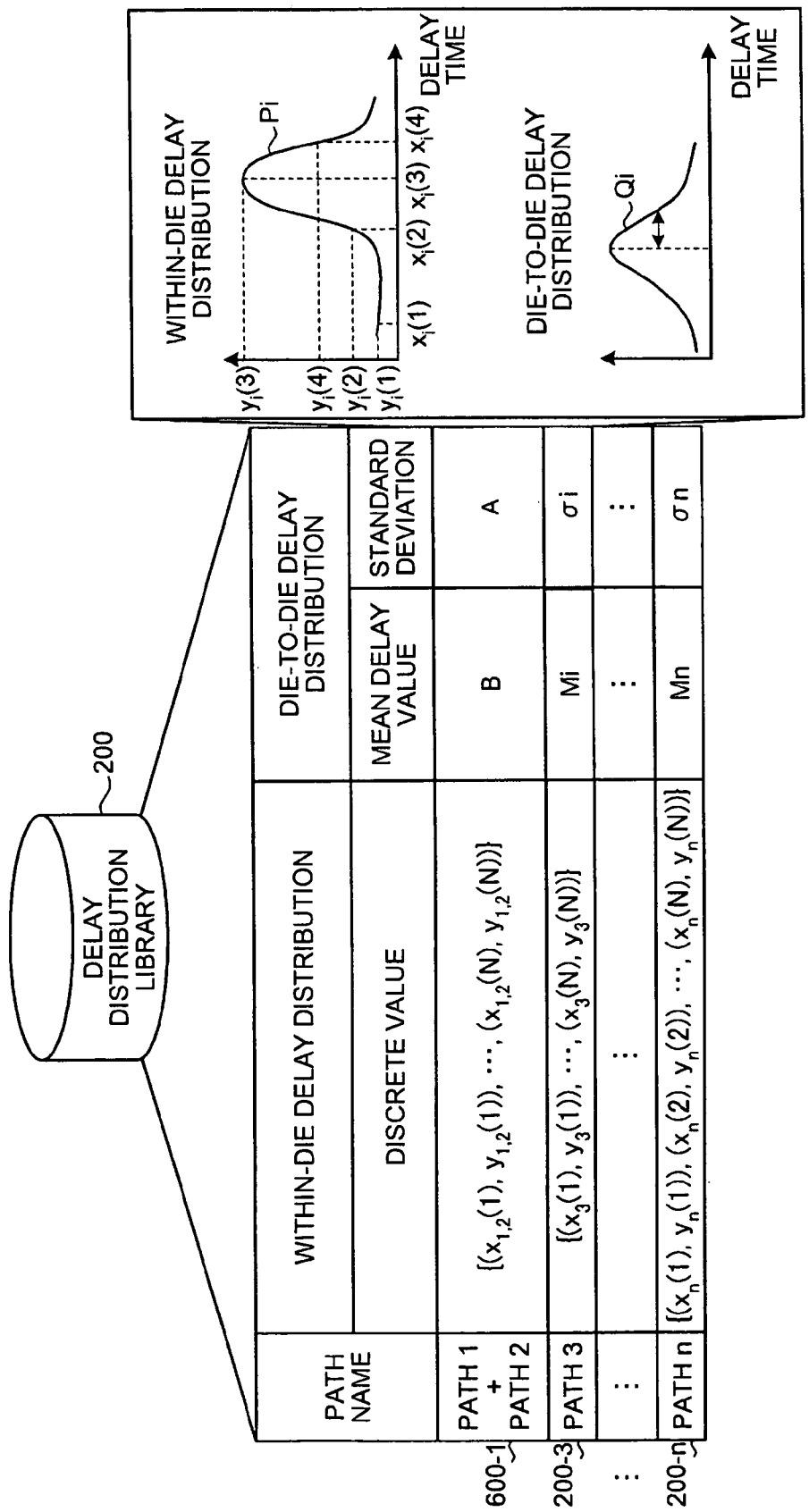
FIG. 6 is a second schematic of contents stored in the delay distribution library.

Contents stored in the delay distribution library 200 where the new delay distribution information is recorded by the recorder 407 will now be explained. FIG. 6 is a second schematic of contents stored in the delay distribution library 200. As shown in FIG. 6, the delay distribution library 200 stores delay distribution information 600-1 when the path 1 and the path 2 depicted in FIG. 3 are integrated as one path.

The delay distribution information 600-1 is information indicative of a delay distribution when the path 1 and the path 2 are integrated as one path and recorded by the recorder 407 in place of the delay distribution information 200-1 concerning the path 1 and the delay distribution information 200-2 concerning the path 2.

When the delay distribution information 600-1 is recorded in place of the respective pieces of delay distribution information 200-1 and 200-2 in this manner, "n" pieces of delay distribution information 200-1 to 200-$n$ stored in the delay distribution library 200 depicted in FIG. 2 are reduced to "n−1" pieces (of delay distribution information 600-1, and 200-3 to 200-$n$) in the delay distribution library 200 depicted in FIG. 6.

That is, the pieces of delay distribution information stored in the delay distribution library 200 are reduced one by one every time the recorder 407 records the new delay distribution information in the delay distribution library 200.

The recorder 407 also records one of the within-die delay distributions and one of the die-to-die delay distributions in the delay distribution aggregation as the within-die delay distribution and the die-to-die delay distribution of one path in place of recording the within-die delay distributions and the die-to-die delay distributions extracted by the extracting unit 401 when the judging unit 403 determines that the effect index is less than a predetermined threshold value.

Specifically, the recorder 407 reads a judgment result of the judging unit 403 from the memory. When the judging unit 403 determines that the effect index is less than the predetermined threshold value, the recorder 407 reads one of the within-die delay distributions and one of the die-to-die delay distributions extracted by the extracting unit 401 from the memory, and records each in the delay distribution aggregation in place of the within-die delay distributions and the die-to-die delay distributions extracted by the extracting unit 401.

More specifically, for example, when the judging unit 403 determines that the effect index is less than the predetermined threshold value, the recorder 407 records the delay distribution information 200-1 concerning the path 1 in the delay distribution library 200 in place of the respective pieces of delay distribution information 200-1 and 200-2 concerning the path 1 and the path 2 extracted from the delay distribution library 200.

That is, the respective pieces of delay distribution information 200-1 and 200-2 concerning the two paths are deleted from the delay distribution library 200, and the delay distribution information 200-1 alone is recorded in the delay distribution library 200 as the delay distribution information when the two paths are integrated as one path. As a result, delay distribution information stored in the delay distribution library 200 is reduced one piece.

The determining unit 408 determines whether within-die delay distributions and die-to-die delay distributions concerning plural paths are stored in the delay distribution aggregation as a result of recording the within-die delay distribution and the die-to-die delay distribution of one path by the recorder 407.

Specifically, for example, the determining unit 408 reads all pieces of delay distribution information stored in the delay distribution library 200, or reads header information indicative of the number of pieces of stored delay distribution information, judges whether plural pieces of delay information are stored, and stores a determination result in the memory.

When the determining unit 408 determines that the within-die delay distributions and the die-to-die delay distributions concerning plural paths are stored in the delay distribution aggregation, the extracting unit 401 extracts the within-die delay distributions and the die-to-die delay distributions of two arbitrary paths from the delay distribution aggregation where the within-die delay distributions and the die-to-die delay distributions are recorded by the recording unit 407.

Specifically, for example, when the determining unit 408 determines that delay distributions concerning plural paths are stored, the extracting unit 401 extracts two arbitrary pieces of delay distribution information from the remaining pieces of delay distribution information stored in the delay distribution library 200. As a result, the effect index calculator 402, the judging unit 403, and the overall path delay distribution calculator 404 recursively execute a series of processing based on the within-die delay distributions and the die-to-die delay distributions of the two paths newly extracted by the extracting unit 401.

The output unit 409 outputs the remaining within-die delay distribution and die-to-die delay distribution stored in the delay distribution aggregation as a delay analysis result of the entire analysis target circuit when the determining unit 408 determines that the within-die delay distributions and the die-to-die delay distributions concerning plural paths are not stored in the delay distribution aggregation.

Specifically, the output unit 409 reads a determination result obtained by the determining unit 408 from the memory, reads the remaining within-die delay distribution and die-to-die delay distribution from the delay distribution aggregation if the determination result indicates that the delay distributions concerning plural paths are not stored, and outputs the read distributions as a delay analysis result of the entire analysis target circuit.

More specifically, when the determining unit 408 determines that the delay distributions concerning plural paths are not stored, the remaining within-die delay distribution and die-to-die delay distribution are read out from the delay distribution aggregation, the remaining within-die delay distribution and die-to-die delay distribution are used to calculate a delay distribution indicative of delay of the entire analysis target circuit, and the calculation result is output as a delay analysis result.

For example, when the determining unit 408 determines that plural pieces of delay distribution information are not stored in the delay distribution library 200, the output unit 409 reads the remaining delay distribution information from the delay distribution library 200, calculates a delay distribution indicative of delay of the entire analysis target circuit, and outputs a calculation result as a delay analysis result.

The setting unit 410 receives input of a setting of a threshold value concerning the effect index. Specifically, the setting unit 410 receives input of a setting of a threshold value concerning the effect index when a user operates the input device 120, e.g., the keyboard 121 or the mouse 122, and stores the received setting in the memory. The threshold value set by the setting unit 410 will be explained hereinafter with reference to FIG. 8.

The judging unit 403 judges whether the effect index calculated by the effect index calculator 402 is equal to or above the threshold value set by the setting unit 410. Specifically, the judging unit 403 reads the threshold value set by the setting unit 410 from the memory, judges whether the effect index calculated by the effect index calculator 402 is equal to or above the threshold value, and stores a judgment result in the memory.

As a result, the threshold value that is compared with the effect index indicative of a relative error of an overall path delay distribution representing delay of one entire path and an overall path delay distribution when two paths are integrated as one path, can be arbitrarily set. That is, when recursively calculating delay distributions of two paths, the paths can be sorted out based on the predetermined threshold value.

Specifically, when the overall path delay distribution of one path is sufficiently slower than the overall path delay distribution when two paths are integrated as one path, i.e., when the effect index is less than the threshold value, a statistical Max operation is not executed. Therefore, calculation processing that rarely affects a delay analysis result can be eliminated, thereby increasing the speed of delay analysis processing.

Figure 7:
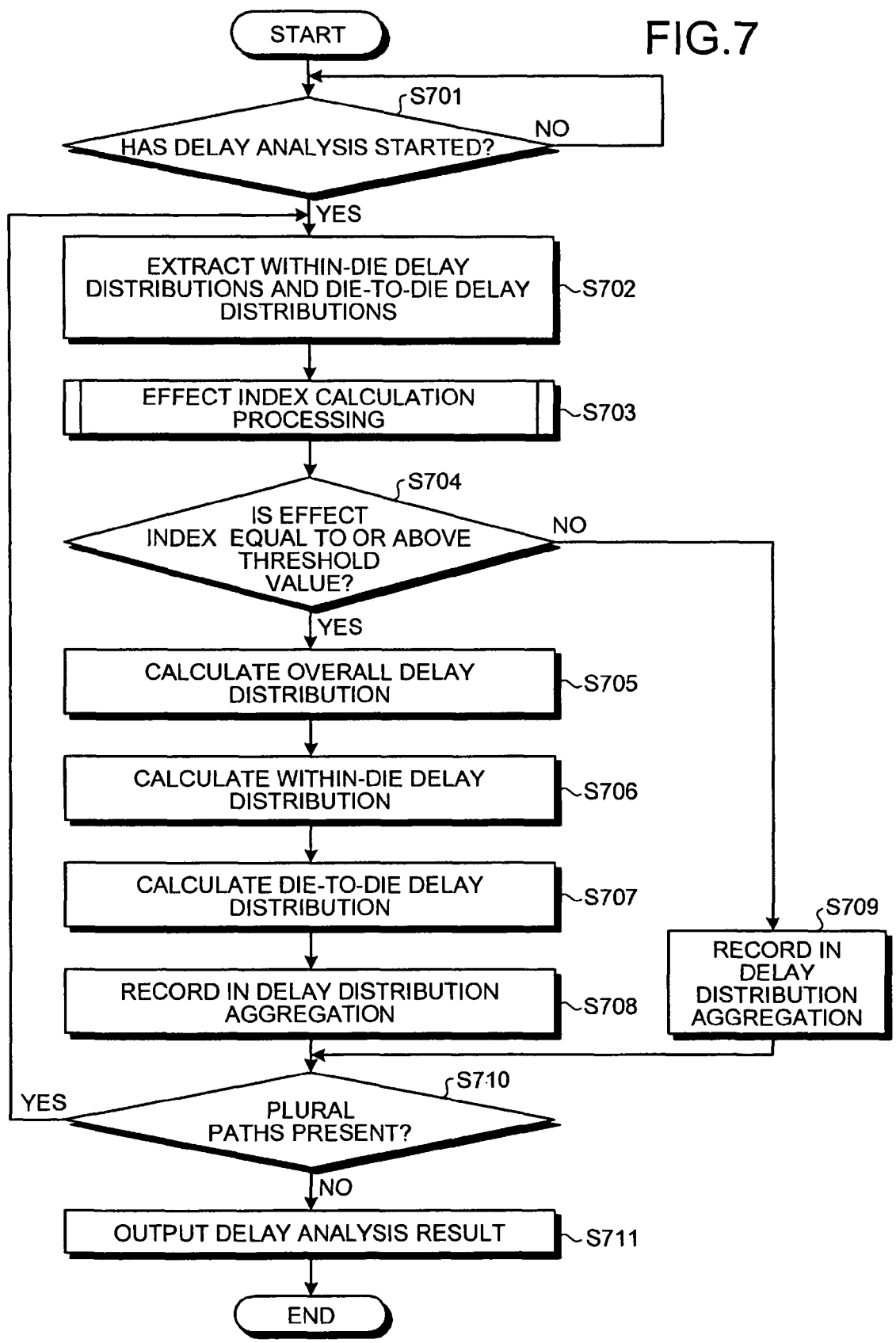
FIG. 7 is a flowchart of a delay analysis processing procedure of the delay analysis apparatus.

FIG. 7 is a flowchart of a delay analysis processing procedure of the delay analysis apparatus 100. As shown in the flowchart of FIG. 7, the delay analysis apparatus 100 judges whether delay analysis of the analysis target circuit has started (step S701). Specifically, for example, the delay analysis apparatus 100 judges whether instruction to start delay analysis of the analysis target circuit has been received when a user operates the input device 120, e.g., the keyboard 121 or the mouse 122 depicted in FIG. 1.

Here, waiting occurs until the start of delay analysis of the analysis target circuit (step S701: NO). When delay analysis starts (step S701: YES), the extracting unit 401 extracts within-die delay distributions and die-to-die delay distributions of two arbitrary paths in the analysis target circuit from the delay distribution aggregation (step S702).

Then, the effect index calculator 402 executes effect index calculation processing to calculate an effect index indicative of a relative error of an overall path delay distribution of one path and an overall path delay distribution when the two paths are integrated as one path, based on the within-die delay distributions and the die-to-die delay distributions of the two paths extracted at step S702 (step S703).

Subsequently, the judging unit 403 judges whether the effect index calculated by the effect index calculating unit 402 is equal to or above a predetermined threshold value (step S704). Specifically, for example, the judging unit 403 judges whether the effect index is equal to or above a threshold value whose setting is received by the setting unit 410.

Here, when the effect index is determined not to be smaller than the predetermined threshold value (step S704: NO), the overall path delay distribution calculator 404 calculates an overall path delay distribution when the two paths are integrated as one path, based on the within-die delay distribution and the die-to-die delay distribution of one path and the within-die delay distribution and the die-to-die delay distribution of the other path extracted at step S702 (step S705).

The within-die delay distribution calculator 405 calculates an within-die delay distribution when the two paths are integrated as on path, based on the within-die delay distribution of one path and the within-die delay distribution of the other path extracted at step S702 (step S706).

Thereafter, the die-to-die delay distribution calculator 406 calculates a die-to-die delay distribution when the two paths are integrated as one path, based on the overall path delay distribution calculated at step S705 and the within-die delay distribution calculated at step S706 (step S707).

Then, the recorder 407 records the within-die delay distribution calculated at step S706 and the die-to-die delay distribution calculated at step S707 in the delay distribution aggregation as the within-die delay distribution and the die-to-die delay distribution of a path in place of the within-die delay distributions and the die-to-die delay distributions extracted at step S702 (step S708).

When the effect index is determined to be less than the predetermined threshold value at step S704 (step S704: NO), the recorder 407 records one of the within-die delay distributions and one of the die-to-die delay distributions extracted at step S702 in the delay distribution aggregation as the within-die delay distribution and the die-to-die delay distribution of the path in place of the within-die delay distributions and the die-to-die delay distributions extracted at step S702 (step S709).

Thereafter, the determining unit 408 judges whether within-die delay distributions and die-to-die delay distributions concerning plural paths are stored in the delay distribution aggregation (step S710). Here, when the determining unit 408 determines that the delay distributions concerning plural paths are stored (step S710: YES), the processing returns to step S702 to repeat a series of processing.

When the determining unit 408 determines that the delay distributions concerning plural paths are not held (step S710: NO), the output unit 409 outputs the remaining within-die delay distribution and die-to-die delay distribution stored in the delay distribution aggregation as a delay analysis result of the entire analysis target circuit (step S711), thereby terminating the series of processing based on the flowchart.

The remaining within-die delay distribution and die-to-die delay distribution may be used to calculate the delay distribution representing overall delay of the entire analysis target circuit and the calculation result may be output as a delay analysis result of the analysis target circuit at step S711. A processing order of the processing at step S705 and that at step S706 may be inverted, or these steps may be simultaneously executed in parallel.

Figure 8:
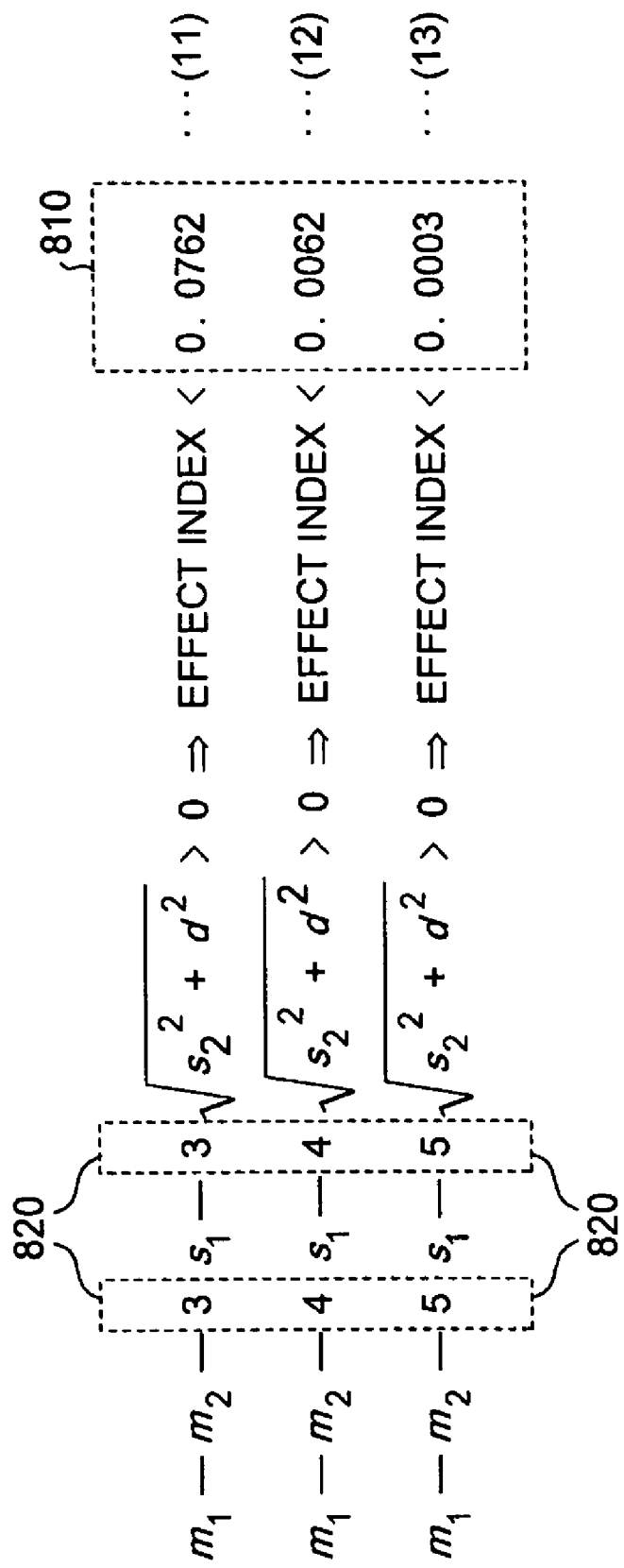
FIG. 8 is a schematic of an example of a mathematical inequality used to calculate the effect index.

The effect index calculation processing procedure at step S703 depicted in FIG. 7 will now be explained. A mathematical inequality that is used to calculate the effect index indicative of a relative error of the overall path delay distribution of one path and the overall path delay distribution when the two paths are integrated as one path will be first explained. FIG. 8 is a schematic of an example of the mathematical inequality used to calculate the effect index.

As shown in FIG. 8, inequalities (11), (12), and (13) are inequalities that represent inequality (2) in a simple manner, inequality (2) estimating a degree of an effect of delay of one of the two paths on the delay in the other path. Here, one of the inequalities (11) to (13) is used to calculate the effect index indicative of a relative error of the overall path delay distribution of one path and the overall path delay distribution when the two paths are integrated as one path.

However, $m_1$ is a mean delay value of the within-die delay distribution of one path (corresponding to the pre-path), $s_1$ is the corresponding standard deviation, $m_2$ is a mean delay value of the within-die delay distribution of the other path (corresponding to the selected path), and $s_2$ is the corresponding standard deviation. An equation $d=|a_1-a_2|$ is provided, where $a_1$ is a standard deviation of the die-to-die delay distribution of one path and $a_2$ is a standard deviation of the die-to-die delay distribution of the other path.

As shown in FIG. 8, each numerical value within a dotted line frame 810 is indicative of a threshold value concerning the effect index set by the setting unit 410. A user can set the threshold value concerning the effect index and a parameter concerning the threshold value by operating the input device 120, e.g., the keyboard 121 or the mouse 122 depicted in FIG. 1.

Changing the threshold value concerning the effect index enables adjustment of calculation accuracy and processing time when executing delay analysis of the analysis target circuit. For example, the greater the threshold value concerning the effect index, the higher the rate of disregarding the effect of delay in the other path, thereby simplifying the delay analysis processing. In this case, the processing time required for delay analysis is reduced and, on the other hand, the accuracy of the delay analysis is also lowered.

The rate of disregarding the effect of delay in the other path is decreased when the threshold value concerning the effect index is low. In this case, the accuracy for the delay analysis rises and, on the other hand, the processing time required for the delay analysis also increases. That is, the user changes the threshold value concerning the effect index to arbitrarily adjust the accuracy and the processing time so that a delay analysis result can be efficiently and accurately obtained.

Here, the threshold value concerning the effect index (dotted line frame 810) and the parameter concerning the threshold value (numerical value indicated in dotted line frames 820) are respectively set. Specifically, in regard to equation (11), a threshold value "0.0762" and a parameter "3" are set. In regard to inequality (12), a threshold value "0.0062" and a parameter "4" are set. In regard to inequality (13), a threshold value "0.0003" and a parameter "5" are set.

Among inequalities (11) to (13), when inequality (11) is used, the processing time required for the delay analysis becomes shortest, but the delay analysis accuracy is lowered. When inequality (13) is used, the processing time required for the delay analysis becomes long, but the delay analysis accuracy can be increased maximally.

Figure 9:
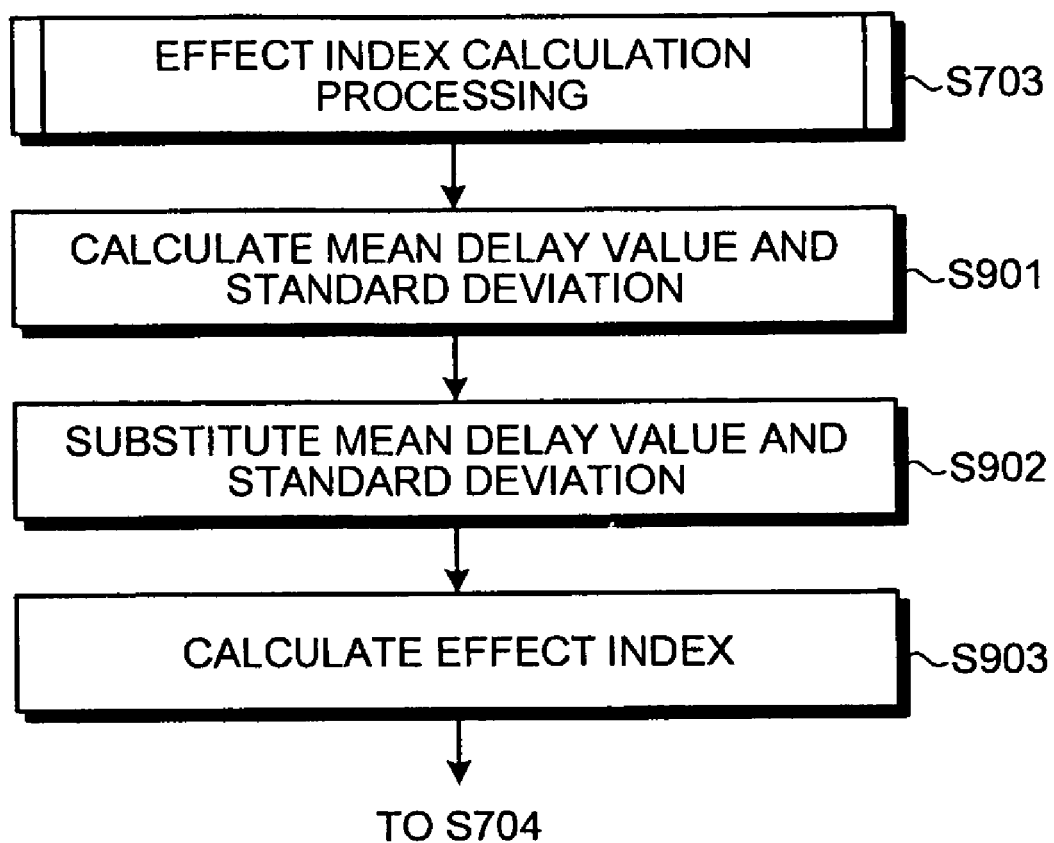
FIG. 9 is a flowchart of the effect index calculation processing at step S703.

FIG. 9 is a flowchart of the effect index calculation processing at step S703. The effect index calculation processing procedure that uses inequality (11) depicted in FIG. 8 to calculate the effect index will be explained.

As shown in the flowchart of FIG. 9, first, a mean delay value and a standard deviation of the within-die delay distribution of one path and a mean delay value and a standard deviation of the within-die delay distribution of the other path are calculated from the within-die delay distributions of the two paths extracted at step S702 depicted in FIG. 7 (step S901).

Then, the mean delay values and the standard deviations of the within-die delay distributions of the two paths calculated at step S901 and standard deviations of the die-to-die delay distributions of the two paths are substituted into inequality (11) (step S902).

Here, substituting these values into inequality (11), enables verification of the inequality (11), thereby enabling calculation of the effect index indicative of a relative error with respect to the overall path delay distribution when the two paths are integrated as one path (step S903), and the processing advances to step S704 depicted in FIG. 7.

Specifically, whether the inequality (11) is verified is judged. When the inequality is verified, the effect index is estimated as a value smaller than the preset threshold value "0.0762". On the other hand, when the inequality is not verified, the effect index is estimated as a value larger than the preset threshold value "0.0762".

As explained above, according to the embodiment of the present invention, when the within-die delay distribution and the die-to-die delay distribution of each path in the analysis target circuit are used to execute the statistical Max operation, the within-die delay distribution and the within-die delay distribution when the two paths are integrated as one path can be recursively calculated.

As a result, the within-die delay distribution and the within-die delay distribution when all paths in the analysis target circuit are integrated as one path can be automatically obtained. A delay distribution representing overall delay of the analysis target circuit can be acquired from the obtained within-die delay distribution and within-die delay distribution, thus accurately estimating circuit delay of the analysis target circuit.

When the effect index is less than the threshold value, i.e., when the overall path delay distribution of one path is sufficiently slower than the overall path delay distribution when the two paths are integrated as one path, the statistical Max operation is not performed with respect to the two paths. As a result, wasteful calculation processing that rarely affects a delay analysis result can be eliminated, thereby increasing the speed of delay analysis processing.

As compared with delay analysis executed with consideration of delay based all circuit elements in a path and delay based on a correlation between circuit elements in each path in the analysis target circuit by the Monte Carlo method, calculation processing can be simplified, and the calculation speed can be increased.

As a result of actually executing delay analysis of the analysis target circuit based on the technique according to the embodiment of the present invention, calculations with respect to approximately six thousand paths among a total of sixty thousand paths enables obtaining a delay analysis result having the same accuracy as that obtained by calculations involving all of the sixty thousand paths.

As explained above, according to the delay analysis apparatus, the delay analysis method, and computer product, efficiently and accurately performing delay analysis of the analysis target circuit enables reducing a burden on a designer and shortening a design period.

The delay analysis method explained in the present embodiment can be implemented by a computer such as a personal computer and a workstation executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The delay analysis apparatus 100 can be realized by an application specific integrated circuit (ASIC) such as a standard cell, a structured ASIC, or a programmable logic device (PLD) such as FPGA. Specifically, for example, the functional units 401 to 410 in the delay analysis apparatus 100 are defined by using hardware description language (HDL) descriptions and the HDL descriptions are logically synthesized and supplied to the ASIC or the PLD, thereby manufacturing the delay analysis apparatus 100.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium storing therein a computer program for analyzing delay in a target circuit having a plurality of paths using within-die delay distributions and die-to-die delay distributions thereof, wherein each within-die delay distribution represents delay based on circuit element performances of all circuit elements in each path and each die-to-die delay distribution represents delay based on a mutual correlation between circuit elements in said each path, the computer program causing a computer to execute:

extracting the within-die delay distributions and the die-to-die delay distributions of two paths from a delay distribution aggregation;

calculating an effect index, which is indicative of a relative error of an overall path delay distribution of one path and an overall path delay distribution of an integrated path formed by the two paths, based on the within-die delay distributions and the die-to-die delay distributions of the two paths;

judging whether the effect index is equal to or greater than a threshold value; and calculating the overall path delay distribution of the integrated path based on a judgment result at the judging.

2. The computer-readable recording medium according to claim 1, wherein the calculating the effect index includes calculating the effect index using statistics of the within-die delay distribution and of the die-to-die delay distribution of the one path and statistics of the within-die delay distribution and of the die-to-die delay distribution of the other path to calculate the effect index.

3. The computer-readable recording medium according to claim 1, wherein the calculating the overall path delay distribution includes calculating the overall path delay distribution of the integrated path, based on the within-die delay distribution and the die-to-die delay distribution of the one path and the within-die delay distribution and the die-to-die delay distribution of the other path, when the effect index is judged to be equal to or greater than the threshold value at the judging.

4. The computer-readable recording medium according to claim 3, further causing a computer to execute:

calculating the within-die delay distribution of the integrated path based on the within-die delay distribution of the one path and the within-die delay distribution of the other path; and calculating the die-to-die delay distribution of the integrated path based on the overall path delay distribution calculated at the calculating the overall path delay distribution and the within-die delay distribution calculated at the calculating the within-die delay distribution.

5. The computer-readable recording medium according to claim 4, further causing a computer to execute recording the within-die delay distribution of the integrated path calculated at the calculating the within-die delay distribution of the integrated path and the die-to-die delay distribution of the integrated path calculated at the calculating the die-to-die delay distribution of the integrated path in the delay distribution aggregation as the within-die delay distribution and the die-to-die delay distribution of the integrated path in place of the within-die delay distributions and the die-to-die delay distributions extracted at the extracting.

6. The computer-readable recording medium according to claim 5, wherein the recording includes recording the within-die delay distribution and the die-to-die delay distribution of the one path in the delay distribution aggregation as the within-die delay distribution and the die-to-die delay distribution of the integrated path in place of the within-die delay distributions and the die-to-die delay distributions extracted at the extracting, when the effect index is judged to be less than the threshold value at the judging.

7. The computer-readable recording medium according to claim 5, further causing a computer to execute:
   determining whether the within-die delay distributions and the die-to-die delay distributions are stored in plural in the delay distribution aggregation as a result of recording the within-die delay distribution and the die-to-die delay distribution of the path at the recording,
   wherein the extracting, the calculating the effect index, and the calculating the overall path delay distribution are executed based on a determination result at the determining.

8. The computer-readable recording medium according to claim 7, further causing a computer to execute outputting the within-die delay distribution and the die-to-die delay distribution stored in the delay distribution aggregation as a delay analysis result of the target circuit when the within-die delay distributions and the die-to-die delay distributions are determined not to be stored in plural in the delay distribution aggregation at the determining.

9. The computer-readable recording medium according to claim 8, wherein the outputting includes outputting a delay distribution representing overall delay of the target circuit as the delay analysis result using the within-die delay distribution and the die-to-die delay distribution that remain stored in the delay distribution aggregation to calculate the delay distribution.

10. The computer-readable recording medium according to claim 1, further causing a computer to execute:
    setting the threshold value,
    wherein at the judging it is judged whether the effect index is equal to or greater than the threshold value set at the setting.

11. A delay analysis apparatus that analyzes delay in a target circuit having a plurality of paths using within-die delay distributions and die-to-die delay distributions thereof, wherein each within-die delay distribution represents delay based on circuit element performances of all circuit elements in each path and each die-to-die delay distribution represents delay based on a mutual correlation between circuit elements in said each path, the delay analysis apparatus comprising:
    an extracting unit that extracts the within-die delay distributions and the die-to-die delay distributions of two paths from a delay distribution aggregation;
    an effect index calculating unit that calculates an effect index, which is indicative of a relative error of an overall path delay distribution of one path and an overall path delay distribution of an integrated path formed by the two paths, based on the within-die delay distributions and the die-to-die delay distributions of the two paths;
    a judging unit that judges whether the effect index is equal to or greater than a threshold value; and
    an overall path delay distribution calculating unit that calculates the overall path delay distribution of the integrated path based on a judgment result of the judging unit.

12. The delay analysis apparatus according to claim 11, wherein the effect index calculating unit uses statistics of the within-die delay distribution and of the die-to-die delay distribution of the one path and statistics of the within-die delay distribution and of the die-to-die delay distribution of the other path to calculate the effect index.

13. The delay analysis apparatus according to claim 11, wherein the overall path delay distribution calculating unit calculates the overall path delay distribution of the integrated path, based on the within-die delay distribution and the die-to-die delay distribution of the one path and the within-die delay distribution and the die-to-die delay distribution of the other path, when the judging unit judges that the effect index is equal to or greater than the threshold value.

14. The delay analysis apparatus according to claim 13, further comprising:
    an within-die delay distribution calculating unit that calculates the within-die delay distribution of the integrated path based on the within-die delay distribution of the one path and the within-die delay distribution of the other path; and
    a die-to-die delay distribution calculating unit that calculates the die-to-die delay distribution of the integrated path based on the overall path delay distribution calculated by the overall path delay distribution calculating unit and the within-die delay distribution calculated by the within-die delay distribution calculating unit.

15. The delay analysis apparatus according to claim 14, further comprising a recording unit that records the within-die delay distribution calculated by the within-die delay distribution calculating unit and the die-to-die delay distribution calculated by the die-to-die delay distribution calculating unit in the delay distribution aggregation as the within-die delay distribution and the die-to-die delay distribution of a path in place of the within-die delay distributions and the die-to-die delay distributions extracted by the extracting unit.

16. The delay analysis apparatus according to claim 15, wherein the recording unit records the within-die delay distribution and the die-to-die delay distribution of the one path in the delay distribution aggregation as the within-die delay distribution and the die-to-die delay distribution of the path in place of the within-die delay distributions and the die-to-die delay distributions extracted by the extracting unit, when the judging unit determines that the effect index is less than the threshold value.

17. The delay analysis apparatus according to claim 15, further comprising:
    a determining unit that determines whether the within-die delay distributions and the die-to-die delay distributions are stored in plural in the delay distribution aggregation as a result of recording the within-die delay distribution and the die-to-die delay distribution of the path by the recording unit,
    wherein the extracting unit, the effect index calculating unit, and the overall path delay distribution calculating unit execute respective processing based on a determination result of the determining unit.

18. The delay analysis apparatus according to claim 17, further comprising an output unit that outputs the within-die delay distribution and the die-to-die delay distribution stored in the delay distribution aggregation as a delay analysis result of the target circuit when the determining unit determines that the within-die delay distributions and the die-to-die delay distributions are not stored in plural in the delay distribution aggregation.

19. The delay analysis apparatus according to claim 18, wherein the output unit uses the within-die delay distribution and the die-to-die delay distribution that remain stored in the delay distribution aggregation to calculate a delay distribution representing overall delay of the target circuit, and outputs the delay distribution as the delay analysis result.

20. A delay analysis method for analyzing delay in a target circuit having a plurality of paths using within-die delay distributions and die-to-die delay distributions thereof, wherein each within-die delay distribution represents delay based on circuit element performances of all circuit elements in each path and each die-to-die delay distribution represents delavbased on a mutual correlation between circuit elements in said each path, the delay analysis method comprising:

extracting the within-die delay distributions and the die-to-die delay distributions of two paths from a delay distribution aggregation;

calculating, by a computer, an effect index, which is indicative of a relative error of an overall path delay distribution of one path and an overall path delay distribution of an integrated path formed by the two paths, based on the within-die delay distributions and the die-to-die delay distributions of the two paths;

judging whether the effect index is equal to or greater than a threshold value; and calculating, by a computer, the overall path delay distribution of the integrated path based on a judgment result at the judging.

* * * * *

UNITED STATES PATENT AND TRADEMARK OFFICE
CERTIFICATE OF CORRECTION

PATENT NO. : 7,870,533 B2
APPLICATION NO. : 12/073039
DATED : January 11, 2011
INVENTOR(S) : Katsumi Homma et al.

It is certified that error appears in the above-identified patent and that said Letters Patent is hereby corrected as shown below:

Column 19, Line 3, In Claim 20, delete "delavbased" and insert --delay based--, therefor.

Signed and Sealed this
Nineteenth Day of April, 2011

David J. Kappos
*Director of the United States Patent and Trademark Office*